Figure 1:
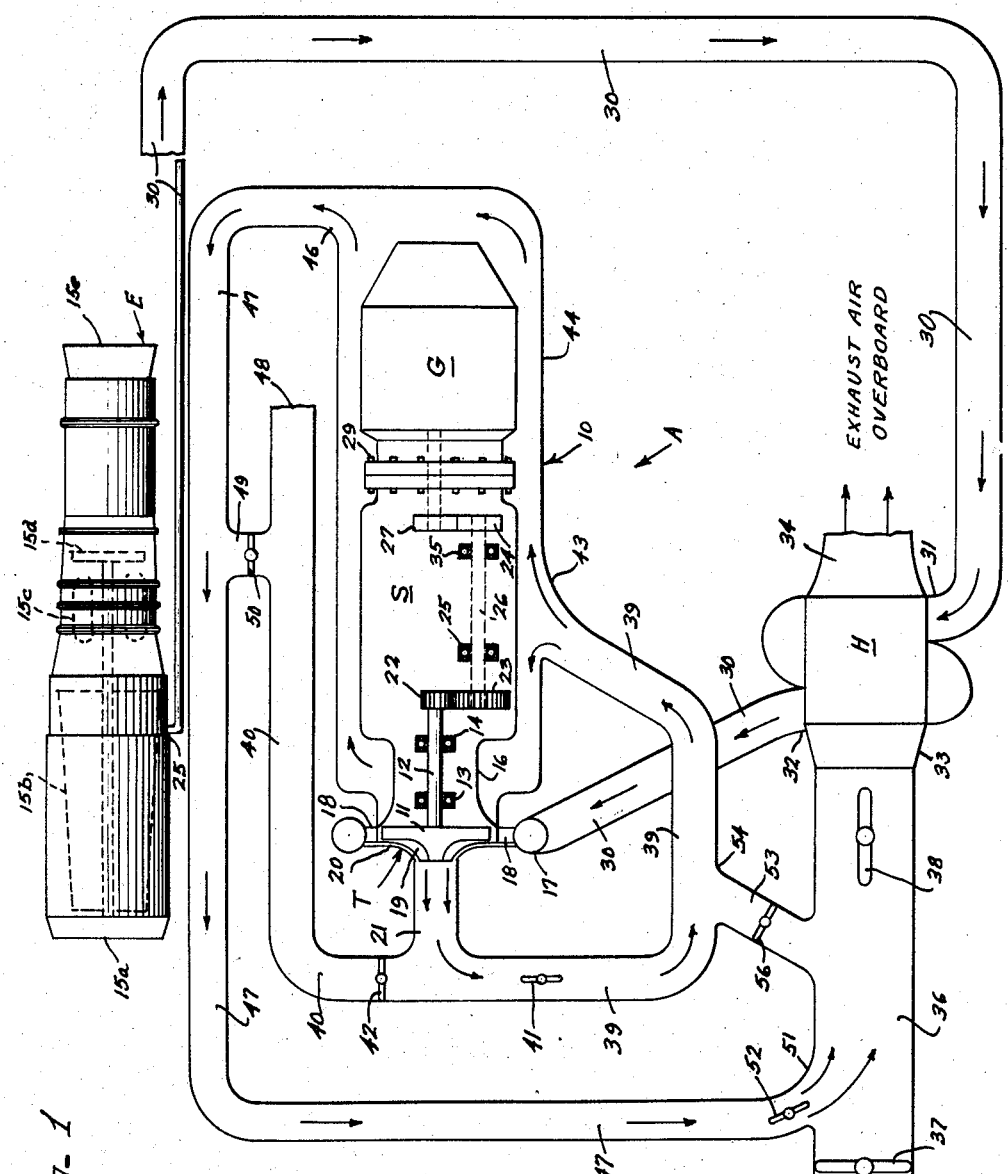

July 7, 1959  R. J. ANDERSON ET AL  2,893,204
SELF-COOLED TURBINE DRIVE
Filed Sept. 11, 1956  3 Sheets-Sheet 3

Inventor
Robert J. Anderson
Joseph T. Hamrick
Attys

United States Patent Office 2,893,204
Patented July 7, 1959

2,893,204
SELF-COOLED TURBINE DRIVE

Robert J. Anderson, Wickliffe, and Joseph T. Hamrick, Parkview, Ohio, assignors to Thompson Ramo Wooldridge Inc., a corporation of Ohio Application September 11, 1956, Serial No. 609,141

6 Claims. (Cl. 60—39.18)

This invention relates to a self-cooled accessory drive for operation in a substantially high temperature environment. Specifically, this invention relates to a self-cooled air turbine driven generator or "power pack," for use in high-speed aircraft, where environmental operating temperatures in the range of 640° to 880° F. may be expected.

The current development of supersonic aircraft and missiles has not only introduced many new problems in the design of the aircraft and power plant, but also in various accessory drives and components. One of the most formidable of these problems, is that of the increased heating of the outside of the aircraft and internal components resulting from increased skin friction and the intake of air at supersonic speeds.

Of the many components now being adversely effected by supersonic heating, the air turbine driven generator or "power pack," such as is used to supply power for various electrical accessories in the aircraft, has been the subject of much study as to the manner of maintaining a sufficiently low operating temperature in the generator when the turbine generator assembly must be operated in an ambient temperature of 640° to 880° F.

Experimental research has indicated that ambient ram air temperatures available to cool the turbine generator when the bleed air temperature from the main compressor approaches 880° F., will be in the order of 640° F. As this value is substantially above normally accepted safe operating temperatures, some form of auxiliary cooling must be resorted to, if operational reliability is to be obtained.

The present invention offers one solution to the supersonic heating problem being encountered in bleed air turbine driven generator assemblies, in the form of an integrated cooling system for the generator and other temperature critical components of the turbine driven generator assembly, which will effectively utilize ram air or regeneratively cooled turbine discharge air as the cooling medium to be selectively circulated around these components during high operating temperature conditions.

Briefly described, the present invention contemplates an air turbine driven electrical generator and intermediate speed proportioning device, as for example a gear box, which are enclosed in a cooling shroud having inlet and outlet conduits formed therein to permit the circulation of a flow of relatively cool ram air or regeneratively cooled turbine discharge air around the components within the shroud, and thereby maintain the operating temperature of the components at a safe operating level. Bleed air from the compressor of a turbojet engine may be intermediately cooled through a heat exchanger using ram air or regeneratively cooled turbine discharge air, before it is directed into the vanes of the air turbine. A suitable system of connecting conduits and valves is provided to permit the cooling system of the present invention to function with a direct flow of ram air through the cooling shroud, or as a system utilizing ram air intercooling for the hot compressor bleed air, or as a regeneratively cooled system utilizing recirculated turbine discharge air as the cooling medium.

By thus providing a cooling system for the temperature critical components of the turbine driven generator or "power pack" of the present invention, operational reliability in the upper limits of the aforementioned environmental temperature range may be expected, which would otherwise be marginal if not impossible. In addition, the cooling system of the present invention may be readily converted to either a regenerative turbine exhaust cooled, ram air cooled, or ram air intercooled system by selectively activating appropriate valves in the connecting conduits.

In the event of an installation of the self-cooled turbine generator system of the present invention in an aircraft designed solely for supersonic operation, as for example in a missile, only the regenerative turbine exhaust intercooling system would be utilized to maintain the operating temperature of the components at a safe value, as the ambient temperature of ram air would be too excessive to have any beneficial cooling effect.

It is an object then of the present invention to provide an improved electrical power system for various accessories of a supersonic aircraft.

Another object of the present invention is to provide an improved self-cooled accessory power system for supersonic aircraft or missiles in which an environmental operating temperature ranging from 450° to 800° F., may be encountered.

Yet another object of the present invention is to provide a combination regenerative turbine exhaust cooled ram air cooled, or ram air intercooled accessory power system for high-speed aircraft which may selectively utilize each of the systems, depending upon a particular operating range.

Many other objects and advantages of the present invention will become manifest to those versed in the art upon making reference to the detailed description which follows and the accompanying sheets of drawings.

Figure 2:
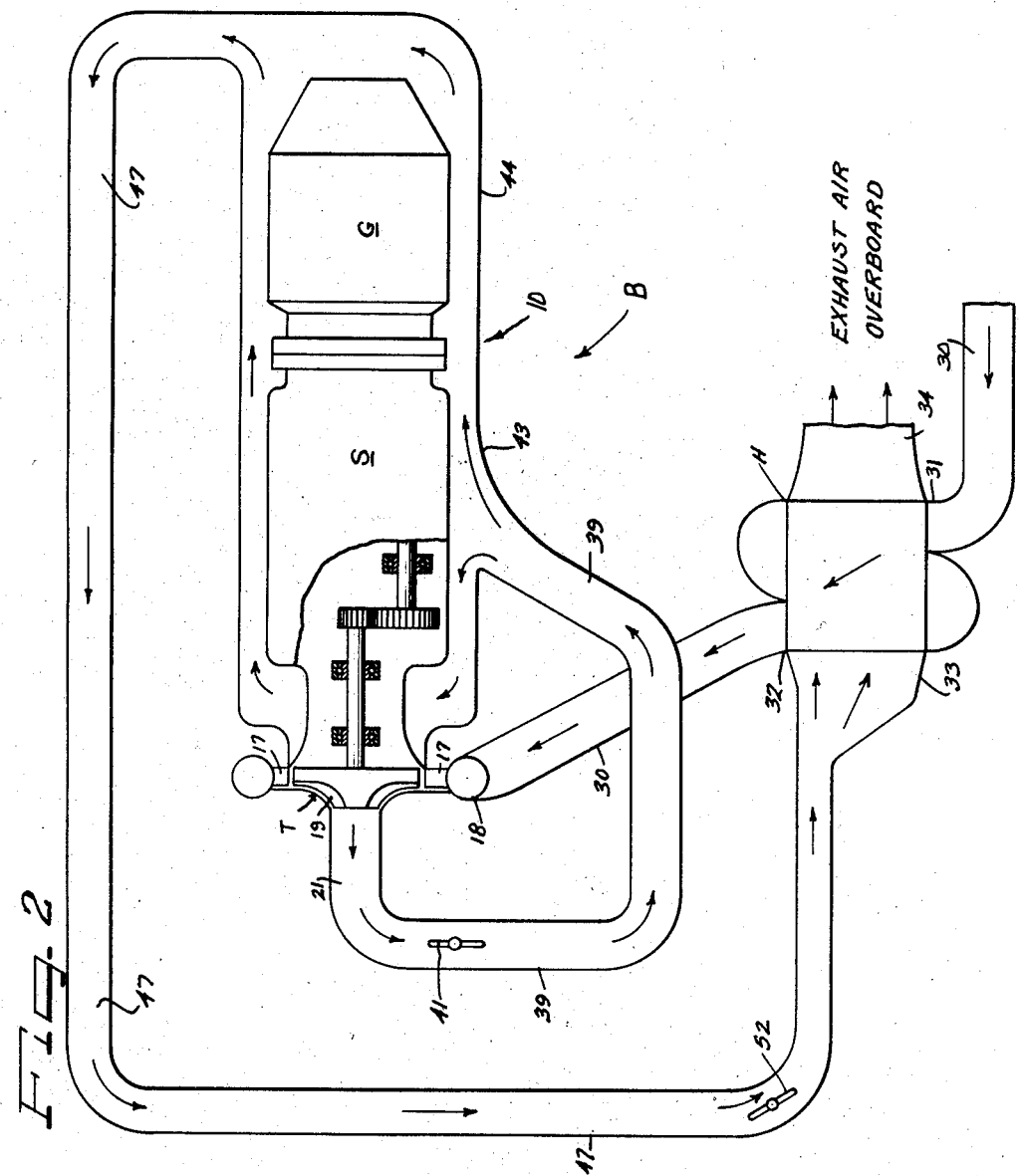
Figure 3:
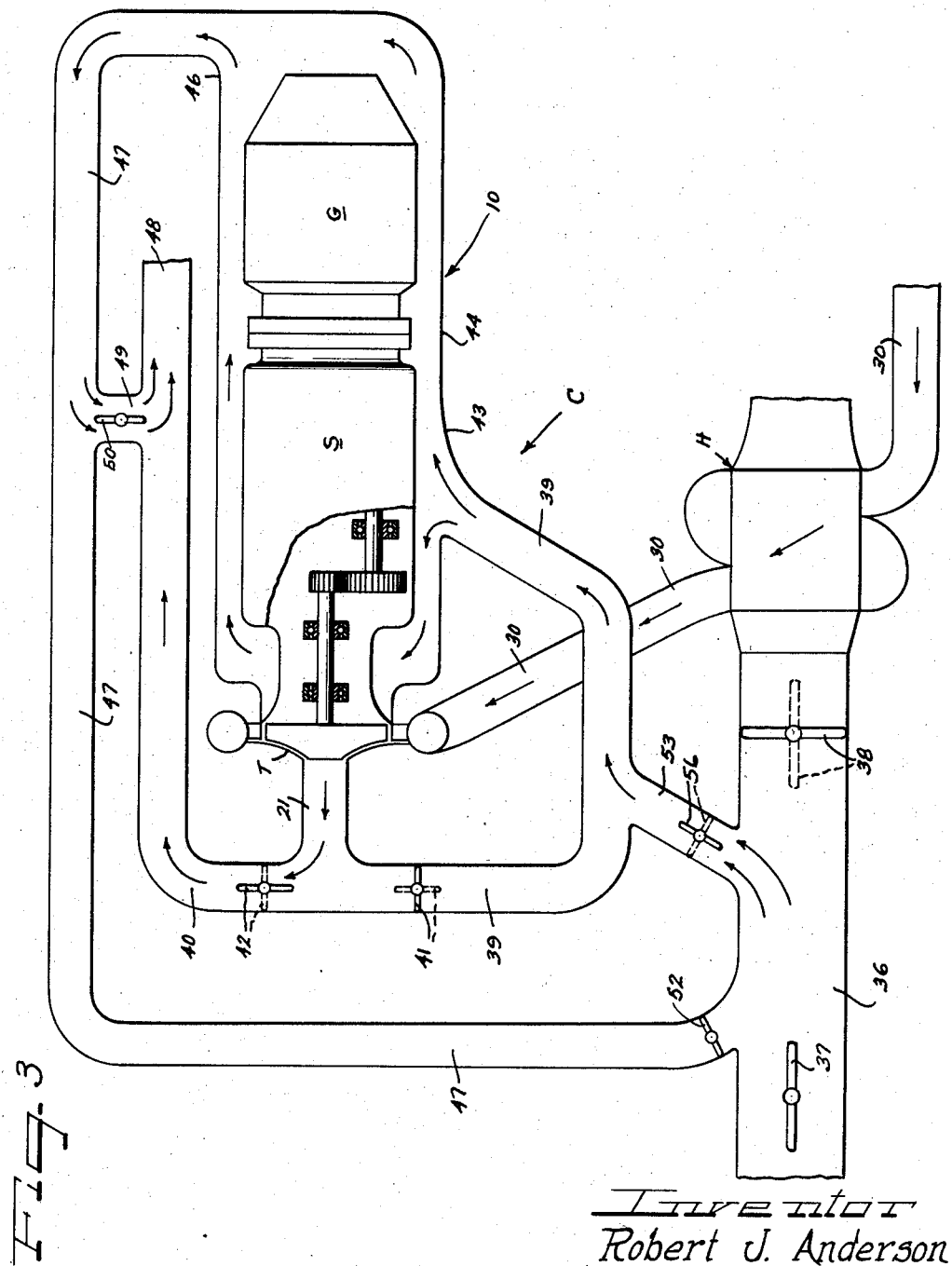

On the drawings:

Figure 1 is a schematic elevational view, with some parts broken away for clarity, of a self-cooled air turbine driven generator utilizing regenerative turbine exhaust intercooling, according to the principles of the present invention;

Figure 2 is a schematic view of a modified form of the self-cooled air turbine driven generator of Figure 1, in which a regenerative flow of turbine discharge air is utilized as the sole means to cool the components of the power system, according to the principles of the present invention; and Figure 3 is a schematic elevational view, with some parts broken away for clarity, illustrating another modified convertible form of the present invention, in which ram air may be directly utilized to cool temperature critical components of the turbine driven accessory power system; or by a change in valve positions, the ram air may be employed to initially cool the compressor bleed air from the main engine before the bleed air enters the turbine and then is utilized to cool the turbine driven generator.

As shown on the drawings:

In Figure 1 a turbine exhaust intercooled accessory power system A is illustrated in junction with a typical turbojet engine E, which is comprised generally of an air turbine driven generator assembly 10, a heat exchanger H, which may effectively use ram air or turbine discharge air to cool bleed air from the compressor of the turbojet engine E, and a system of interconnecting conduits and valve assemblies which permit a conversion of the turbine exhaust intercooled accessory power system A to a ram air cooled or ram air intercooled system.

The turbojet engine E is of the conventional type having an inlet 15a which supplies a flow of air to a compressor 15b and combustion chambers 15c. The combustion chambers 15c in turn direct a pressurized flow of combustion chamber gases through a turbine 15d to an outlet 15e. Bleed air from the compressor 15b is removed through an outlet 25 to a bleed air conduit 30, as will be explained in more detail later.

The air turbine driven generator assembly 10 is comprised of a centrifugal turbine assembly T, an intermediate speed proportioning device or gear box S, and an electrical generator or alternator G.

The turbine assembly T includes a single stage centrifugal turbine 11 which is secured to a drive shaft 12. Suitable bearing assemblies 13 and 14 rotatably journal the shaft 12 in a housing 16. An annular volute 17 is provided around the periphery of the turbine 11 to direct a flow of pressurized bleed air through a nozzle assembly 18 into a system of radial blades 19 on the turbine 11. The turbine 11 and nozzle assembly 17 are enclosed by a housing 20 which has an axial outlet 21 formed therein to discharge expanded, low velocity bleed air flowing centrally inwardly from the turbine blades 19. The expansion of the air through the turbine blades 19, of course, creates a temperature drop to produce a discharge flow of cooling air.

It should be understood that while a single stage centrifugal type turbine 11 is illustrated in Figure 1, some other suitable turbine wheel might be substituted, as for example an axial flow turbine or a multi-stage centrifugal type turbine, depending on the particular installation.

The speed proportioning device S, illustrated in Figure 1, may be for example, in the form of a gear box which comprises a driven gear 22 secured to the turbine drive shaft 12, a pair of idler gears 23 and 24 respectively, secured to an idler drive shaft 26, and a driving gear 27 secured to a drive shaft 28. The idler gear 23 is in toothed engagement with the driving gear 22 and transmits torque from the turbine 11 to the idler shaft 26 at some predetermined reduction speed, depending upon the gear ratio between the driven gear 22 and idler gear 23. A pair of bearing assemblies 25 and 35, respectively, journal the idler shaft 26.

The idler gear 24 is in toothed engagement with the driving gear 27, and transmits torque from the idler shaft 26 to the drive shaft 28. The drive shaft 28 is suitably connected to the armature of the generator G, as for example by a spline or key (not shown). The idler gear 24 will thus transmit torque from the idler shaft 26 through the driving gear 27 and drive shaft 28 at some predetermined gear ratio, or in direct drive depending upon the final effective gear ratio desired between the turbine drive shaft 12 and armature drive shaft 28.

It will be understood that while a simple gear box is illustrated in Figure 1 as a means of obtaining a proportionate speed control between the turbine assembly T and electrical generator G, any other suitable speed proportioning system might be incorporated, as for example, a fluid torque converter. In addition, it should also be understood that various idler gears having different gear ratios may be substituted on the idler gear shaft 26 to thereby provide any desired rotational ratio between the turbine assembly T and generator G, depending on the rated speed of each of these components.

The generator G, illustrated in Figure 1, is secured to the speed proportioning device S by a plurality of suitable fasteners 29, and a plurality of similar fasteners not shown, retain the turbine assembly T to the speed proportioning device S.

It will be understood that while a 115 volt, 400 cycle, 3 phase alternator is referred to as exemplary of the generator G, any other suitable alternator or direct current generator could be substituted instead depending upon the load requirements of the particular installation.

The turbine assembly T receives a driving flow of pressurized bleed air through the conduit 30, which communicates with the annular volute 18 of the turbine assembly T. The pressurized air is obtained for example by bleeding air from the last stages of the compressor of a turbojet engine, not shown. Before entering the volute 18, the bleed air in the conduit 30 is directed through an intermediate heat exchanger H to be cooled before entering the volute 18 of the turbine assembly T.

It should be understood that any other suitable source of pressurized gases could be utilized in the conduit 30 to drive the turbine assembly T, the bleed air source from the compressor of the turbojet engine above referred to, being illustrated by way of preferred example only.

The heat exchanger H is provided with a hot bleed air inlet 31 and a cooled bleed air outlet 32. A cooling air inlet 33 and an exhaust air outlet 34 are also provided. The bleed air conduit 30 in the heat exchanger H, is formed with a series of reentrant undulated turns to provide a large heat transferring surface area for a circulating flow of cooling air flowing through the heat exchanger H, thereby substantially reducing the temperature of the bleed air entering the turbine assembly T.

A ram air conduit 36 communicates with the inlet 33 of the heat exchanger H, and is provided with an inlet valve 37 and a downstream shutoff valve 38. A selective activation of the valves 37 and 38 will permit the heat exchanger H to be cooled by ram air or a flow of turbine discharge air, as will be more fully explained later.

After the bleed air has passed through the turbine assembly T, it will be directed through the turbine discharge outlet 21 to thereafter enter either branch of a forked discharge outlet conduit 39 and 40 respectively. As shown in Figure 1, the branch 39 of the turbine discharge air outlet conduit 21 is provided with a valve 41 immediately adjacent the fork in the outlet 21, and the outlet branch 40 is similarly provided with a valve 42 immediately adjacent the turbine discharge air outlet conduit 21.

When the valve 41 is in an open position, and the valve 42 is in a closed position, as illustrated in Figure 1, turbine discharge air will be directed through the outlet conduit 39 to an inlet 43 in a cooling shroud 44, which encloses the speed proportioning device S, and generator G. An outlet 46 in the cooling shroud 44 communicates with a cooling air outlet conduit 47 to form a flow path for cooling air flowing through the cooling shroud 44.

When the valve 41 is closed and the valve 42 is open, as shown in Figure 3, turbine discharge air in the outlet 21 will be directed through the branch 40 to be exhausted at some suitable point of discharge on the aircraft, as through an overboard outlet 48.

Thus it will be appreciated that the turbine discharge air in the outlet conduit 21 may be directed through the conduit 39 and cooling shroud 44 to cool the speed proportioning device S and generator G, when the valves 41 and 42 are in the position illustrated in Figure 1, and alternatively, the turbine discharge air may be directed through the outlet conduit 40 to a discharge outlet 48, by positioning the valves 41 and 42 in their solid line position, as shown in Figure 3.

A by-pass conduit 49 connects the turbine air discharge outlet conduit 40 and cooling air outlet conduit 47, to permit a direct exhaust of the cooling air in the cooling shroud 44, through the by-pass 49, to the point of discharge 48, whenever a direct discharge of the cooling air is desired. A valve 50 in the by-pass conduit 49 controls the direct by-pass of cooling air to the point of discharge 48.

When the by-pass valve 50 in the by-pass conduit 49 is in the position illustrated in Figure 1, turbine discharge air will be directed through the conduit 47 to a point of intersection 51 with the ram air conduit 36, upstream of the heat exchanger H. A valve 52 is provided in the conduit 47 immediately upstream of the intersection 51 to control the flow of cool discharge turbine air in the conduit 47 into the ram air conduit 36.

A ram air by-pass conduit 53 intersects the ram air conduit 36, at a point downstream of the intersection 51 between the cooling air outlet conduit 47 and ram air conduit 36. The ram air by-pass conduit 53 intersects the turbine discharge air conduit 39 at a point 54 downstream of the valve 41 to permit a by-pass flow of ram air from the conduit 36 to the cooling shroud 44, whenever the temperature of the ram air is sufficient to adequately cool the speed proportioning device S and generator G, enclosed by the cooling shroud 44. A valve 56 is provided in the by-pass conduit 53 to prevent a by-pass flow of ram air or a recirculation of turbine discharge air from the conduit 47 without passing through the heat exchanger H.

Thus it will be appreciated that when the valves are in the respective positions illustrated in Figure 1, a regenerative cooling system for the speed proportioning device S and generator G is described, which utilizes relatively cold turbine discharge air to initially cool the temperature critical components of the turbine generator system 10, and then to additionally cool bleed air in the conduit 30 while passing through the reentrant conduit passages in the heat exchanger H.

The regenerative or turbine exhaust intercooling system illustrated in Figure 1 provides a substantially closed circuit cooling system for the temperature critical components of the turbine generator system 10, which is capable of maintaining the temperature critical components at a substantially cooler operating temperature than if ram air alone were resorted to as the cooling medium, particularly in a supersonic aircraft application where the ram air ambient temperature may range between 640° to 800° F.

Turbine discharge flowing through the outlet conduit 21 is at a substantially reduced temperature relative to the temperature of the same air in the conduit 30 before entering the volute 18 of the turbine assembly T, due to the large reduction in the enthalpy of the air as a result of the expansion and work done by the air while passing through the vanes 19 of the turbine 11. The relatively cold turbine discharge air source thus produced may then be effectively utilized to cool the temperature critical components in the cooling shroud 44, when ram air temperatures becomes excessively high.

In the operation of the cooling system illustrated in Figure 1, bleed air in the conduit 30 from the compressor of the turbojet engine E is intermediately cooled by the heat exchanger H before entering the turbine assembly T. Expanded relatively cold turbine discharge air emerges axially from the turbine impeller 11 into the outlet conduit 21 where it is directed into the cooling conduit 39 by the open and closed positions of valves 41 and 42, respectively. Cold turbine discharge air in the conduit 39 is then directed into cooling shroud 44 through an inlet 43 to cool the speed proportioning device S, generator G and other temperature critical components in the shroud 44. After flowing around and cooling the temperature critical components in the cooling shroud 44, the turbine discharge air enters the discharge conduit 47, to be directed through the open valve 52 into the ram air conduit 36, downstream of the ram air shutoff valve 37. The recirculated turbine discharge air then flows through the heat exchanger H to regeneratively cool bleed air in the conduit 30 before it is discharged overboard through the outlet 34 in the ram air heat exchanger H.

Referring now to Figure 2, a modified form of the cooling system illustrated in Figure 1 is illustrated, where like reference numerals and letters have been assigned to identify identical parts.

In Figure 2, a pure regenerative turbine discharge air cooling system for the air turbine driven generator assembly 10, is illustrated, designated generally by the reference letter B, no provision being made for ram air cooling or intercooling of the bleed air.

The cooling system B, will find particular application in supersonic aircraft and missiles where the intercooling effects obtained from a flow of ram air through the heat exchanger H would be negligible, if not detrimental, due to the extremely high temperature ambient present at these speeds.

As the cooling system B of Figure 2 is of the pure regenerative type using compressor bleed air cooled by expansion through the turbine ram air inlet scoops and ducting are eliminated, thereby effectively reducing the overall weight of the aircraft and simplifying the number of controls in the system.

As the operation of the regenerative cooling system B, illustrated in Figure 2, is identical with that of the cooling system A, illustrated in Figure 1, reference is made to the description of that system in this specification for a more detailed explanation of the parts and associated components.

Attention is called to the fact that in the cooling system B, shown in Figure 2, the valve 41 in the cooling conduit 39 may be used to throttle the flow of air through the turbine assembly T whenever the valve is activated toward its closed position, thereby controlling the speed of the turbine wheel 11 and the amount of cooling air available to cool the temperature critical components in the cooling shroud 44.

Referring now to Figure 3, a convertible ram air cooled and ram air intercooled cooling system C is illustrated, which is substantially the same as the cooling system A of Figure 1 to which like reference numerals and letters have been assigned to identify identical parts.

The air turbine driven generator assembly 10, of Figure 3, is identical to the turbine driven generator assembly 10 shown in Figure 1, to which reference should be made for a more detailed description of the parts and components, like reference numerals and letters being used to identify identical parts.

The ram air cooled turbine driven generator assembly C of Figure 3 differs only in operation form that of the regeneratively cooled turbine generator assembly A of Figure 1, in that the operating position of all of the valves are respectively reversed from their positions shown in Figure 1. With the valves in the solid line position shown in Figure 3, ram air is utilized as the sole cooling medium for the temperature critical components of the air turbine driven generator assembly 10 enclosed by the cooling shroud 44.

In the operation of the ram air cooled cooling system C shown in Figure 3, ram air is taken aboard the aircraft through the ram air conduit 36 and directed through the ram air by-pass conduit 53 into the cooling air conduit 39, the heat exchanger control valve 38 and the cooling air discharge conduit valve 52 being in a closed position. Ram air in the conduit 39 will thus flow through the inlet 43 into the cooling shroud 44, where it will be circulated around the speed proportioning device S, generator G and other temperature critical components.

After cooling the various components in the cooling shroud 44, the ram air will flow through the outlet 46 in the cooling shroud 44, into the discharge conduit 47, where it is diverted through the open valve 50 in the by-pass conduit 49, into the flow of turbine discharge air in the conduit 40, to be exhausted overboard with the turbine discharge air at a point of discharge 48. Bleed air in the conduit 30 passes through the heat exchanger H into the turbine assembly T, without intercooling, to drive the turbine driven generator assembly 10.

Exhausted turbine air discharging axially from the turbine assembly T of Figure 3 is directed through the outlet conduit 21, past the open valve 42 into the turbine air discharge outlet conduit 40 to join with the flow of ram air through the by-pass conduit 49 and concurrently flow with the ram air to the point of discharge 48.

The valve 41 in the turbine air discharge conduit 39 is shown in a closed position to prevent a diversion of the ram air flow through this branch of the turbine air discharge conduit, and also to prevent any build-up of back pressure against the discharge flow from the turbine assembly T.

The ram air cooled cooling system C, illustrated in Figure 3, will find particular application in aircraft and missiles operating in a subsonic or transonic speed range, wherer the bleed air temperature from the compressor is not so excessive as to require intercooling through a heat exchanger and also where ram air temperature is of a sufficient low value as to provide adequate cooling for the temperature critical components in the air turbine driven generator assembly 10.

An increase in turbine efficiency can be expected in the ram air cooling system shown in Figure 3, due to the fact that discharge air from the turbine will be directed immediately overboard at the point of discharge, rather than being forced to flow through the cooling shroud 44 and heat exchanger H, as in the previous systems, thereby eliminating duct losses present in a regenerative cooling system.

To convert the ram air cooled cooling system C of Figure 3 into a ram air intercooled turbine driven generator system, which is similar in structure and operation to the regeneratively cooled turbine generator system A, illustrated in Figure 1, it is only necessary to reverse the position of the valves 38, 41, 42 and 56, from their solid line position to their dotted line position, as so indicated. In Figure 3, as in the preceding figures, like reference letters and numerals have been assigned to indicate identical parts.

The air turbine driven generator assembly 10 in the ram air intercooled turbine generator system, is identical with the same assembly illustrated in the previously described cooling systems, and reference should be made to the description of these systems in this specification for a more detailed expanation of its parts and function.

In the operation of the ram air intercooled turbine driven generator assembly, valves 37 and 38 in the ram air conduit 36 are shown in a full open position, thereby permitting a cooling flow in a full open position, heat exchanger H to cool bleed air in a conduit 30 before entering the turbine assembly T.

Valves 41 and 42 in each branch of the turbine discharge air conduit 39 and 40, respectively, are in a similar position to the valves 41 and 42 of Figure 1, thereby directing the flow of turbine discharge air in the outlet 21 through the conduit 39 through the inlet 43 and the cooling shroud 44 to cool the temperature critical components of the turbine driven generator assembly 10.

After circulating around the components enclosed by the cooling shroud 44, turbine discharge air will pass through the outlet 46, in the cooling shroud 44, to the discharge conduit 47, and then through the open valve 50 and the by-pass conduit 49, into the discharge conduit 40, to be there discharged at the point of discharge 48.

The valve 52 in the inlet 51 of the intersecting discharge conduit 47 is in a closed position to prevent a flow of turbine discharge air from the interior of the cooling shroud 40 into the ram air conduit 36.

The valve 56 in the ram air by-pass conduit 53 is in a closed position to prevent a by-pass flow of ram air from the conduit 36 into the turbine discharge air conduit 39, which would otherwise interfere with the regenerative cooling cycle described by the turbine discharge air circulating through the cooling shroud 44.

Thus it will be appreciated that the converted ram air intercooling system for bleed air entering the turbine assembly T, and the regenerative turbine discharge air cooling cycle through the cooling shroud 44 to cool the temperature critical components of the turbine generator system 10, provides an intermediate type of cooling system which effectively utilizes ram air and turbine discharge air to obtain the most efficient cooling characteristics in a particular operational range.

The converted ram air intercooling system illustrated in Figure 3, therefore presents a compromise cooling system between the cooling system A of Figure 1, and the ram air cooling system of Figure 3, which may be very advantageously exploited under certain operating conditions in which either of the aforementioned systems would not prove most efficient.

While only four embodiments of the present invention have been illustrated and described in Figures 1 to 3, it should be understood that many other modifications and variations may be effected without departing from the scope of the novel concepts herein disclosed.

We claim as our invention:

1. A turbine and cooling system for high altitude operation comprising an air turbine for operating aircraft accessory equipment and having an inlet and air exhaust, a cooling shroud for said accessory equipment, an exhaust conduit connected to receive a flow of exhaust air from the turbine and connected to direct the expanded cool exhaust air into the shroud, an operating air supply line leading to the turbine inlet for supplying air from a pressurized air supply, a heat exchanger in said air supply line, a first cooling conduit leading from the turbine exhaust to said heat exchanger, a second cooling conduit leading to said heat exchanger and open to receive ram air, and valve means positioned in said first and second conduits to control air flow through said first and second cooling conduits and selectively movable to a first position or a second position, said first conduit being closed and said second conduit being open in said first position whereby ram air is used for the heat exchanger and turbine exhaust air is used solely for the cooling shroud, said first conduit being open and said second conduit being closed in said second position whereby exhaust air is used for both the cooling shroud and the heat exchanger.

2. A turbine and cooling system for high altitude operation comprising an air turbine for operating aircraft accessory equipment having an air inlet and an air exhaust for cool expanded air discharged from the exhaust, a cooling shroud for said accessory equipment, an operating air supply line leading to the turbine for supplying air from a pressurized air supply, a heat exchanger connected in said air supply line to cool the supply air, a first cooling conduit connected between said turbine exhaust and said shroud to direct cooled expanded turbine air through said shroud, a second cooling conduit open to receive ram air and connected to direct air to said heat exchanger, a third cooling conduit leading from the shroud to the heat exchanger, a fourth conduit leading from said shroud and open to dump air overboard, a first valve in said second conduit, a second valve in said third conduit and a third valve in said fourth conduit for controlling the flow of shroud air dumped overboard, said valves selectively operable between a first and a second position, said first and third valves closed and said second valve open in said first position whereby the air from the shroud performs a secondary cooling in the heat exchanger, and said first and third valves open and said second valve closed in said second position whereby the shroud air is dumped and the heat exchanger is cooled by ram air, said valves operating in first position to utilize air from the shroud to cool the heat exchanger where it is cooler than the ram air or in second position to dump the shroud air overboard and use ram air for cooling the heat exchanger.

3. A turbine and cooling system for high altitude operation comprising an air turbine for operating aircraft accessory equipment having an air inlet and an air exhaust, a cooling shroud for said accessory equipment, an operating air supply line leading to the turbine for supplying air from a pressurized air supply, a heat exchanger connected in said air supply line to cool the supply air, a first cooling conduit connected between the turbine exhaust and the shroud to direct cooled expanded turbine air through the shroud, a second cooling conduit open to ram air and connected to said heat exchanger, a third cooling conduit open to ram air and connected to the shroud to direct ram air thereto, a fourth conduit connected to said exhaust to dump exhaust air overboard, a first valve in said first cooling conduit to control the flow of exhaust air to the shroud, a second valve in said fourth conduit to control the dumping of exhaust air overboard, a third valve in said third conduit to control the flow of ram air to the shroud, said valves selectively movable to a first or a second position, said first valve open and said second and third valves closed in said first position whereby the shroud will be cooled by exhaust air, and said first valve closed and said second and third valves open in said second position whereby said exhaust air will be dumped overboard and the shroud will be cooled by ram air.

4. A turbine and cooling system for high altitude operation comprising an air turbine for operating aircraft accessory equipment and having an air inlet and an air exhaust, a cooling shroud for said accessory equipment, an operating air supply line leading to the turbine inlet for supplying air from a pressurized air supply, a heat exchanger connected in said air supply line for cooling the supply air, a first cooling air conduit connected to the air exhaust of the turbine and to the shroud, a second cooling air conduit connected to the exhaust of the turbine and to the heat exchanger, a third cooling air conduit open to ram air and connected to the shroud, a fourth cooling air conduit open to ram air and connected to the heat exchanger, a fifth cooling air conduit connected to the turbine exhaust and open to dump exhaust air overboard, and valves in each of said conduits movable between a closed and open position and selectively operable between a first operating position and a second operating position, said first and second conduit valves being closed and said third, fourth and fifth conduit valves being open in said first operating position and said first and second conduit valves being open and said third, fourth and fifth conduit valves being closed in said second operating position whereby the shroud and heat exchanger will both be cooled by ram air in said first operating position and will both be cooled by turbine exhaust air in said second operating position.

5. A combination ram air and regeneratively cooled electrical generating system for an air compressor equipped turbojet engine powered aircraft or the like, which comprises an air turbine having an air inlet and an air exhaust, an electrical generator driven thereby, means connected between the generator and turbine for proportioning the speed of said generator relative to said turbine, a cooling shroud enclosing temperature critical components of said electrical generator, a heat exchanger, a conduit leading to the heat exchanger for receiving a flow of bleed air from the compressor of a turbojet engine, a ram air conduit open at one end to ram air and connected to the heat exchanger for delivering a flow of ram air to said heat exchanger, a first ram air control valve in the upstream end of said ram air conduit controlling the flow of ram air therethrough, a second ram air control valve in the downstream end of said ram air conduit downstream from said first valve controlling the flow of ram air through said heat exchanger, a first turbine discharge air conduit communicating with the interior of said cooling shroud and connected to the exhaust from the turbine, a first discharge air control valve in said first turbine discharge air conduit, a second turbine discharge air conduit connected to the exhaust from the turbine and open to discharge air overboard from the turbine, a second discharge air control valve in said second turbine discharge air conduit, a ram air by-pass conduit leading from said ram air conduit between said first and second ram air control valves and communicating with said first turbine discharge air conduit between said first discharge air control valve and said cooling shroud, a cooling shroud outlet conduit communicating with the interior of said cooling shroud and intersecting said ram air conduit between said first and second ram air valves, an outlet conduit valve in said cooling shroud outlet conduit, a cooling shroud outlet by-pass conduit communicating with said cooling shroud outlet conduit upstream of said outlet conduit valve and with said second turbine discharge air conduit downstream of said second discharge air control valve, and a cooling shroud outlet by-pass conduit valve in said cooling shroud by-pass outlet conduit regulating a by-pass flow of air to a point of discharge for said system, said valves selectively movable between a first and a second position, in said first position said valves positioned with the upstream end of the ram air conduit closed, the downstream end of the ram air conduit open, said first turbine air conduit open, said second turbine air conduit closed, said ram air by-pass conduit closed, said cooling shroud outlet conduit open, and said cooling shroud outlet by-pass conduit closed, and in said second position said upstream end of the ram air conduit open, the downstream end of the ram air conduit open, said first turbine air conduit closed, said second turbine air conduit open, said ram air by-pass conduit open, said cooling shroud outlet conduit closed, and said cooling shroud outlet by-pass conduit open.

6. A turbine driven accessory power system for a turbojet engine having an air compressor or the like, comprising an air turbine assembly, an alternator, a gear box connecting the air turbine assembly to the alternator, a compressor in said turbojet engine, a bleed air conduit withdrawing bleed air from said compressor to drive said turbine assembly, a ram air heat exchanger between said compressor and air turbine assembly operatively connected with said bleed air conduit in heat exchange relation therewith, a ram air conduit supplying a flow of ram air to said ram air heat exchanger, a first valve in said ram air conduit regulating the flow of ram air therethrough, a cooling shroud enclosing said air turbine assembly, gear box and alternator, a first turbine discharge air conduit communicating with the interior of said cooling shroud to supply a cooling flow of air therein, a second turbine discharge air conduit communicating turbine discharge air to a point of exhaust, valves in said first and second turbine discharge air conduits to selectively control the disposition of said turbine discharge air, a cool air exhaust conduit withdrawing cool air from said cooling shroud and communicating said cool air to said ram air conduit downstream of said first valve, a valve regulating the flow of cool air to said ram air conduit, a by-pass conduit connecting said cool air exhaust conduit and said second turbine discharge air conduit, a valve in said by-pass conduit regulating the by-pass flow of said cool air to said point of exhaust, a by-pass ram air conduit communicating with said first turbine discharge air conduit, a valve in said by-pass ram air conduit controlling the flow of ram air to said cooling shroud, and a second valve in said ram air conduit downstream of said by-pass ram air conduit regulating the flow of ram air through said ram air heat exchanger and by-pass ram air conduit.

(References on following page)

References Cited in the file of this patent

UNITED STATES PATENTS

| | | | |
|---|---|---|---|
| 515,585 | Hill | Feb. 27, | 1894 |
| 1,440,000 | Bonine | Dec. 26, | 1922 |
| 2,352,793 | Lennes | July 4, | 1944 |
| 2,391,838 | Kleinhans | Dec. 25, | 1945 |
| 2,477,637 | Mercier | Aug. 2, | 1949 |
| 2,508,397 | Kane | May 23, | 1950 |
| 2,582,848 | Price | Jan. 15, | 1952 |
| 2,612,020 | Griffith | Sept. 30, | 1952 |
| 2,678,542 | Stanton | May 18, | 1954 |
| 2,691,274 | Whitney | Oct. 12, | 1954 |
| 2,696,712 | Lewis | Dec. 14, | 1954 |
| 2,767,561 | Seeger | Oct. 23, | 1956 |